US010223611B1

(12) United States Patent
Price et al.

(10) Patent No.: US 10,223,611 B1
(45) Date of Patent: Mar. 5, 2019

(54) OBJECT DETECTION USING IMAGE CLASSIFICATION MODELS

(71) Applicant: Capital One Services, LLC, McLean, VA (US)

(72) Inventors: Micah Price, Plano, TX (US); Jason Hoover, Grapevine, TX (US); Geoffrey Dagley, McKinney, TX (US); Stephen Wylie, Carrollton, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/915,329

(22) Filed: Mar. 8, 2018

(51) Int. Cl.
*G06K 9/00* (2006.01)
*G06K 9/62* (2006.01)

(52) U.S. Cl.
CPC ......... *G06K 9/6232* (2013.01); *G06K 9/6256* (2013.01); *G06K 9/6267* (2013.01); *G06K 9/6298* (2013.01)

(58) Field of Classification Search
CPC .. G06K 9/6232; G06K 9/6267; G06K 9/6256; G06K 9/6298
USPC ....................................................... 382/103
See application file for complete search history.

(56) References Cited

U.S. PATENT DOCUMENTS

2018/0061059 A1* 3/2018 Xu ................. G06T 7/0081
2018/0137338 A1* 5/2018 Kraus .......... G06K 9/00147

OTHER PUBLICATIONS ujjwalkarn, "An Intuitive Explanation of Convolutional Neural Networks", https://ujjwalkarn.me/2016/08/11/intuitive-explanation-convnets/ (Aug. 11, 2016).*
Sharma V, Avinash, "Understanding Activation Functions in Neural Networks", https://medium.com/the-theory-of-everything/understanding-activation-functions-in-neural-networks-9491262884e0 (Mar. 30, 2017).*
Ren et al., "Faster R-CNN: Towards Real-Time Object Detection with Region Proposal Networks" arXiv:1506.01497v3 [cs.Cv] Jan. 6, 2016.*
Howard, et al., "MobileNets: Efficient Convolutional Neural Networks for Mobile Vision Applications," arXiv:1704.04861v1, Apr. 17, 2017, 9 pages.
Zhou, et al., "Learning Deep Features for Discriminative Localization," Computer Science and Artificial Intelligence Laboratory, MIT, 9 pages.

* cited by examiner

*Primary Examiner* — Andrew M Moyer
(74) *Attorney, Agent, or Firm* — DLA Piper LLP US

(57) ABSTRACT

In one aspect, the present disclosure relates to a method for or performing single-pass object detection and image classification. The method comprises receiving image data for an image in a system comprising a convolutional neural network (CNN), the CNN comprising a first convolutional layer, a last convolutional layer, and a fully connected layer; providing the image data to an input of the first convolutional layer; extracting multi-channel data from the output of the last convolutional layer; and summing the extracted data to generate a general activation map; and detecting a location of an object within the image by applying the general activation map to the image data.

20 Claims, 6 Drawing Sheets

OBJECT DETECTION USING IMAGE CLASSIFICATION MODELS

BACKGROUND

Machine learning (ML) can be applied to various computer vision applications, including object detection and image classification (or "image recognition"). General object detection can be used to locate an object (e.g., a car or a bird) within an image, whereas image classification may involve a relatively fine-grained classification of the image (e.g., a 1969 Beetle, or an American Goldfinch). Convolutional Neural Networks (CNNs) are commonly used for both image classification and object detection. A CNN is a class of deep, feed-forward artificial neural networks that has successfully been applied to analyzing visual imagery. Generalized object detection may require models that are relatively large and computationally expensive, presenting a challenge for resource-constrained devices such as some smartphones and tablet computers. In contrast, image recognition may use relatively small models and require relatively little processing.

SUMMARY

According to one aspect of the present disclosure, a method may perform object detection using image classification models. The method may comprise: receiving image data for an image, wherein the image data is received in a system comprising a convolutional neural network (CNN), the CNN comprising an input layer, a first convolutional layer coupled to the input layer, a last convolutional layer, a fully connected layer coupled to the last convolution layer, and an output layer; providing the image data to the input layer; extracting multi-channel data from the last convolutional layer; summing the multi-channel data to generate a general activation map; and detecting a location of an object within the image by applying the general activation map to the image data.

In some embodiments, generating the general activation map comprises generating the general activation map without using class-specific weights. In some embodiments, detecting the location of an object within the image comprises identifying a bounding box within the image based on comparing values within the general activation map to a predetermined threshold value. In some embodiments, detecting the location of an object within the image comprises: interpolating data within the general activation map; and identifying a bounding box within the image using the interpolated data. In some embodiments, detecting the location of an object within the image comprises upscaling the general activation map based on dimensions of the image.

According to another aspect of the present disclosure, a method may be used to augment an image using single-pass object detection and image classification. The method may comprise: receiving image data for an image, wherein the image data is received in a system comprising a convolutional neural network (CNN), the CNN comprising an input layer, a first convolutional layer coupled to the input layer, a last convolutional layer, a fully connected layer coupled to the last convolution layer, and an output layer; extracting multi-channel data from the output of the last convolutional layer; summing the extracted data to generate a general activation map; detecting a location of an object within the image by applying the general activation map to the image data; receiving one or more classifications the output layer; and displaying the image and a content overlay, wherein a position of the content overlay relative to the image is determined using the detected object location, wherein the content overlay comprises information determined by the one or more classifications.

In some embodiments, generating the general activation map comprises generating the general activation map without using class-specific weights. In some embodiments, detecting the location of an object within the image comprises identifying a bounding box within the image based on comparing values within the general activation map to a predetermined threshold value. In some embodiments, detecting the location of an object within the image comprises: interpolating data within the general activation map; and identifying a bounding box within the image using the interpolated data. In some embodiments, detecting the location of an object within the image comprises upscaling the general activation map based on dimensions of the image.

According to another aspect of the present disclosure, a system performs single-pass object detection and image classification. The system may comprise: a processor; a convolutional neural network (CNN) configured for execution on the processor, the CNN comprising a first convolutional layer, a last convolutional layer, and a fully connected layer, wherein an output of the last convolutional layer is coupled to an input of the fully connected layer; an image ingestion module configured for execution on the processor to receive image data for an image and to provide the image data to an input of the first convolutional layer; an object detection module configured to extract multi-channel data from the output of the last convolutional layer, sum the extracted data to generate a general activation map, and to detect a location of an object within the image by applying the general activation map to the image data; and an image augmentation module configured for execution on the processor to receive one or more classifications from an output of the fully connected layer and to display the image and a content overlay, wherein a position of the content overlay relative to the image is determined using the detected object location.

In some embodiments, generating the general activation map comprises generating the general activation map without using class-specific weights. In some embodiments, detecting the location of an object within the image comprises identifying a bounding box within the image based on comparing values within the general activation map to a predetermined threshold value. In some embodiments, the computer program code that when executed on the processor causes the processor to execute a process operable to: interpolate data within the general activation map; and identify a bounding box within the image using the interpolated data. In some embodiments, detecting the location of an object within the image comprises upscaling the general activation map based on dimensions of the image.

According to another aspect of the present disclosure, a non-transitory computer-readable medium may store program instructions that are executable to: receive image data for an image, wherein the image data is received in a system comprising a convolutional neural network (CNN), the CNN comprising a first convolutional layer, a last convolutional layer, and a fully connected layer, wherein an output of the last convolutional layer is coupled to an input of the fully connected layer; provide the image data to an input of the first convolutional layer; extract multi-channel data from the output of the last convolutional layer; sum the extracted data to generate a general activation map; detect a location of an object within the image by applying the general activation map to the image data; receive one or more classifications from an output of the fully connected layer; and display the image and a content overlay, wherein a position of the content overlay relative to the image is determined using the detected object location.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings.

The drawings are not necessarily to scale, or inclusive of all elements of a system, emphasis instead generally being placed upon illustrating the concepts, structures, and techniques sought to be protected herein.

DETAILED DESCRIPTION

Described herein are systems and methods for object detection using image classification models. In some embodiments, an image is processed through a single-pass convolutional neural network (CNN) trained for fine-grained image classification. Multi-channel data may be extracted from the last convolution layer of the CNN. The extracted data may be summed over all channels to produce a 2-dimensional matrix referred herein as a "general activation map." the general activation maps may indicate all the discriminative image regions used by the CNN to identify classes. This map may be upscaled and used to see the "attention" of the model and used to perform general object detection within the image. "Attention" of the model pertains to which segments of the image the model is paying most "attention" to based on values calculated up through the last convolutional layer that segments the image into a grid (e.g., a 7×7 matrix). The model may give more "attention" to segments of the grid that have higher values, and this corresponds to the model predicting that an object is located within those segments. In some embodiments, object detection is performed in a single-pass of the CNN, along with fine-grained image classification. In some embodiments, a mobile app may use the image classification and object detection information to provide augmented reality (AR) capability.

Some embodiments are described herein by way of example using images of specific objects, such as automobiles. The concepts and structures sought to be protected herein are not limited to any particular type of images.

Figure 1:
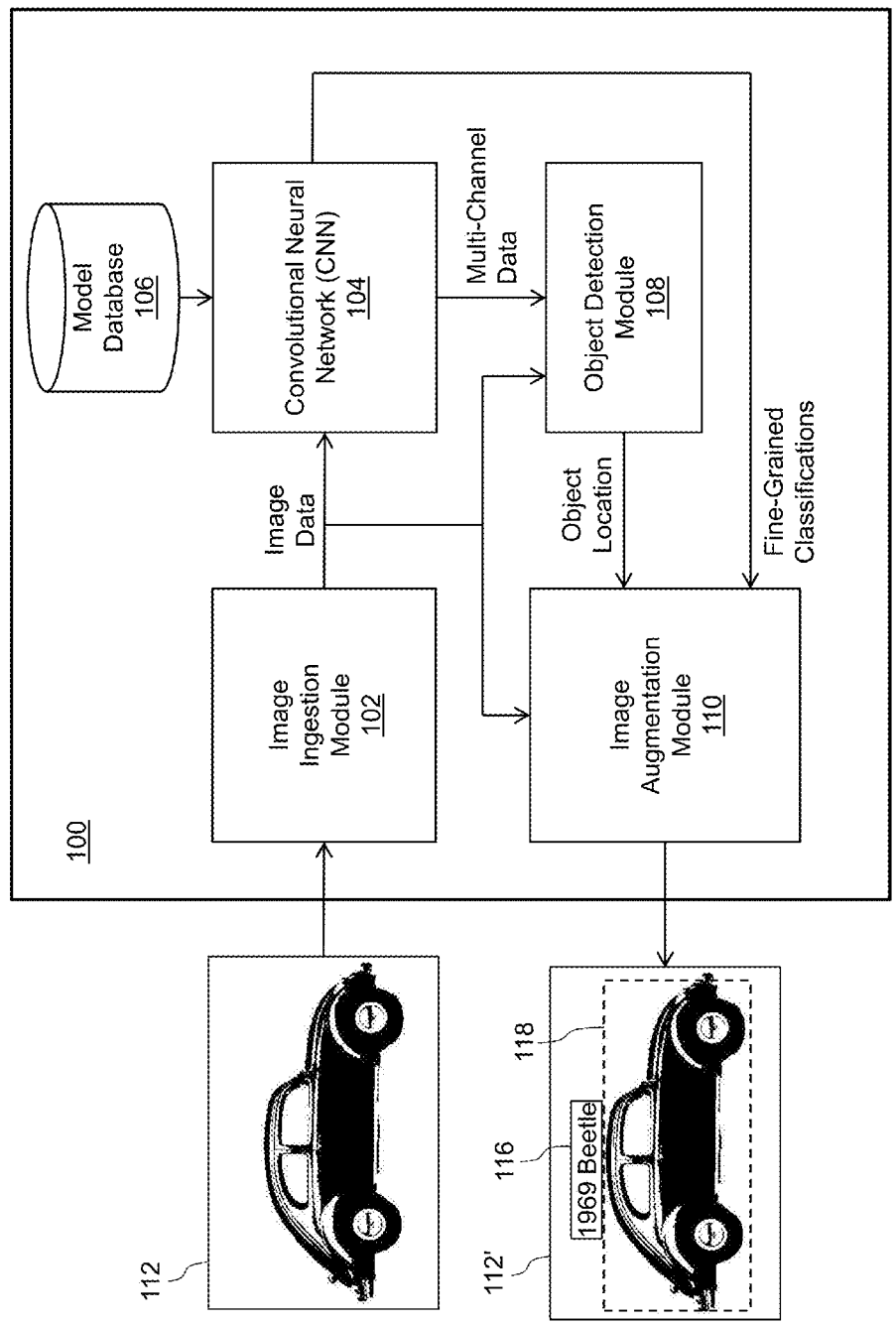
FIG. 1 is a block diagram of a system for object detection and image classification, according to some embodiments of the present disclosure.

Referring to FIG. 1, a system 100 may perform object detection and image classification, according to some embodiments of the present disclosure. The illustrative system 100 includes an image ingestion module 102, a convolutional neural network (CNN) 104, a model database 106, an object detection module 108, and an image augmentation module 110. Each of the modules 102, 104, 108, 110 may include software and/or hardware configured to perform the processing described herein. In some embodiments, the system modules 102, 104, 108, 110 may be embodied as computer program code executable on one or more processors (not shown). The modules 102, 104, 108, 110 may be coupled as shown in FIG. 1 or in any suitable manner. In some embodiments, the system 100 may be implemented within a user device, such as user device 600 described below in the context of FIG. 6.

The image ingestion module 102 receives an image 112 as input. The image 112 may be provided in any suitable format, such as Joint Photographic Experts Group (JPEG), Portable Network Graphics (PNG), or Graphics Interchange Format (GIF). In some embodiments, the image ingestion module 102 includes an Application Programming Interface (API) via which users can upload images.

The image ingestion module 102 may receive images having an arbitrary width, height, and number of channels. For example, an image taken with a digital camera may have a width of 640 pixels, a height of 960 pixels, and three (3) channels (red, green, and blue) or one (1) channel (greyscale). The range of pixel values may vary depending on the image format or parameters of a specific image. For example, in some cases, each pixel may have a value between 0 to 255.

The image ingestion module 102 may convert the incoming image 112 into a normalized image data representation. In some embodiments, an image may be represented as C 2-dimensional matrices stacked over each other (one for each channel C), where each of the matrices is a W×H matrix of pixel values. The image ingestion module 102 may resize the image 112 to have dimensions W×H as needed. The values W and H may be determined by the CNN architecture. In one example, W=224 and H=224. The normalized image data may be stored in memory until it has been processed by the CNN 104.

The image data may be sent to an input layer of the CNN 104. In response, the CNN 104 generates one or more classifications for the image at an output layer. The CNN 104 may use a transfer-learned image classification model to perform "fine-grained" classifications. For example, the CNN may be trained to recognize a particular automobile make, model, and/or year within the image. As another example, the model may be trained to recognize a particular species of bird within the image. In some embodiments, the trained parameters of the CNN 104 may be stored within a non-volatile memory, such as within model database 106. In certain embodiments, the CNN 104 uses an architecture similar to one described in A. Howard et al., "MobileNets: Efficient Convolutional Neural Networks for Mobile Vision Applications," which is incorporated herein by reference in its entirety.

As will be discussed further below in the context of FIG. 2, the CNN 104 may include a plurality of convolutional layers arranged in series. The object detection module 108 may extract data from the last convolutional layer in this series and use this data to perform object detection within the image. In some embodiments, the object detection module 108 may extract multi-channel data from the CNN 104 and sum over the channels to generate a "general activation map." This map may be upscaled and used to see the "attention" of the image classification model, but without regard to individual classifications or weights. For example, if the CNN 104 is trained to classify particular makes/models/years of automobiles within an image, the general activation map may approximately indicate where any automobile is located with the image.

The object detection module 108 may generate, as output, information describing the location of an object within the image 112. In some embodiments, the object detection module 108 outputs a bounding box that locates the object within the image 112.

The image augmentation module 110 may augment the original image to generate an augmented image 112' based on information received from the CNN 104 and the objection detection module 108. In some embodiments, the augmented image 112' includes the original image 112 overlaid with some content ("content overlay") 116 that is based on CNN's fine-grained image classification. For example, returning to the car example, the content overlay 116 may include the text "1969 Beetle" if the CNN 104 classifies an image of a car as having model "Beetle" and year "1969." The object location information received from the object detection module 108 may be used to position the content overlay 116 within the 112'. For example, the content overlay 116 may be positioned along a top edge of a bounding box 118 determined by the object detection module 108. The bounding box 118 is shown in FIG. 1 to aid in understanding, but could be omitted from the augmented image 112'.

Figure 6:
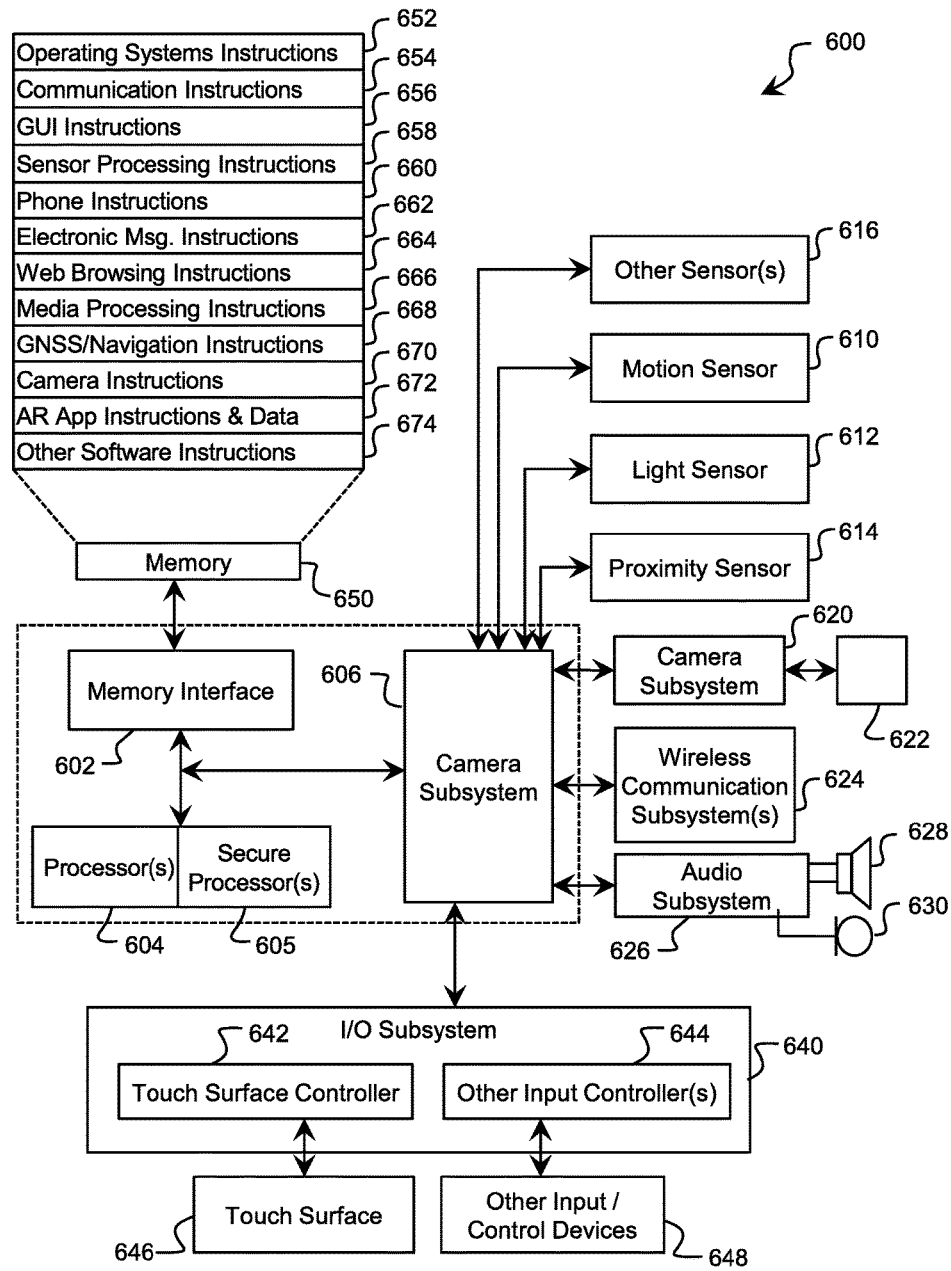
FIG. 6 is a block diagram of a user device, according to an embodiment of the present disclosure.

In some embodiments, the system 100 may be implemented as a mobile app configured to run on a smartphone, tablet, or other mobile device such as user device 600 of FIG. 6. In some embodiments, the input image 112 be received from a mobile device camera, and the augmented output image 112' may be displayed on a mobile device display. In some embodiments, the app may include augmented reality (AR) capabilities. For example, the app may allow a user to point their mobile device camera at an object and, in real-time or near real-time, see an augmented version of that object based on the object detection and image classification. In some embodiments, the mobile app may augment the display with information pulled from a local or external data source. For example, the mobile app may use the CNN 104 to determine a vehicle's make/model/year and then automatically retrieve and display loan rate information from a bank for that specific vehicle.

Figure 2:
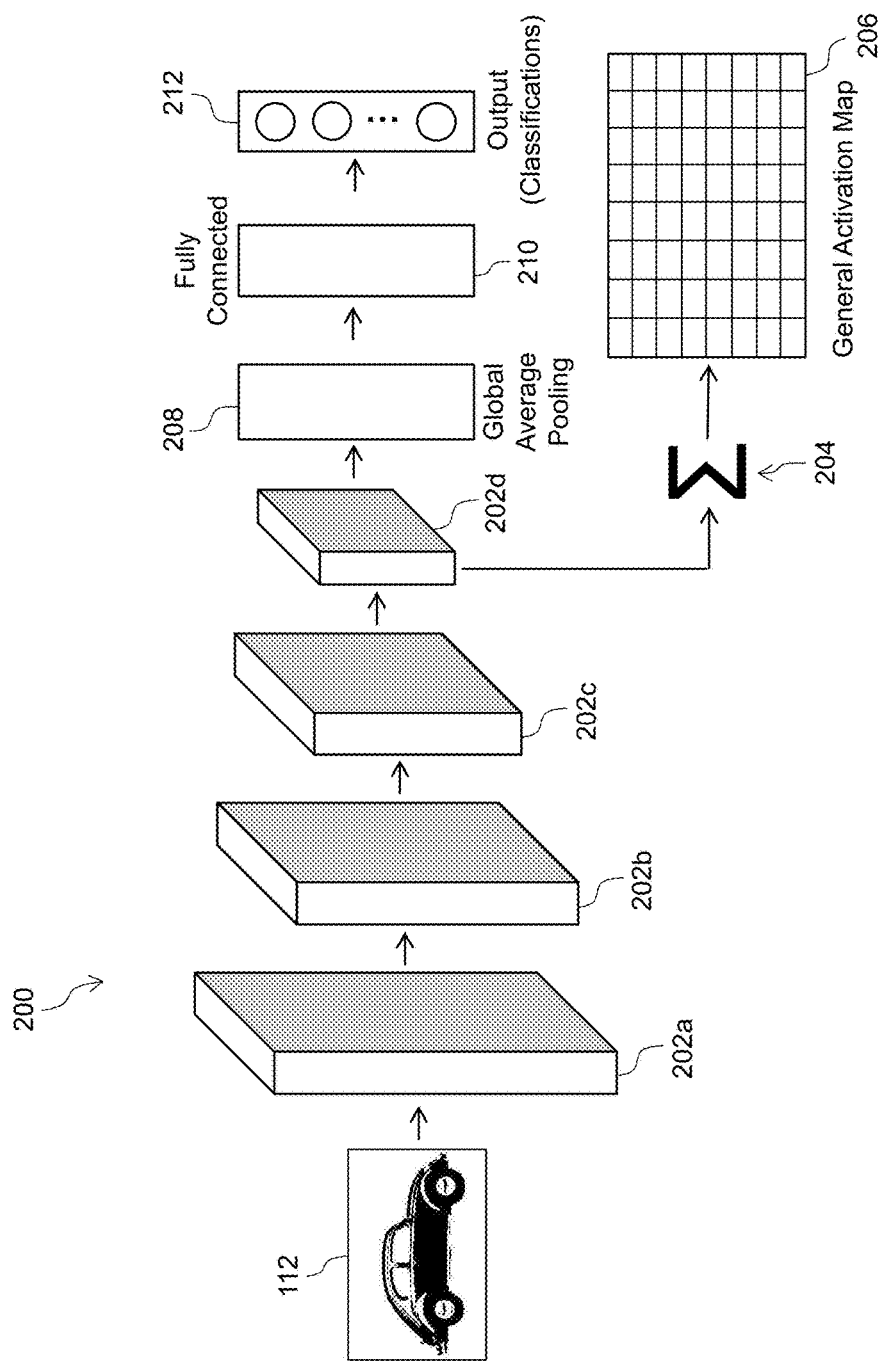
FIG. 2 is a diagram illustrating a convolutional neural network (CNN), according to some embodiments of the present disclosure.

FIG. 2 shows an example of a convolutional neural network (CNN) 200, according to some embodiments of the present disclosure. The CNN 200 may include an input layer (not shown), a plurality of convolutional layers 202a-202d (202 generally), a global average pooling (GAP) layer 208, a fully connected layer 210, and an output layer 212.

The convolutional layers 202 may be arranged in series as shown, with a first convolutional layer 202a coupled to the input layer, and a last convolutional layer 202d coupled to the GAP layer 208. The layers of the CNN 200 may be implemented using any suitable hardware- or software-based data structures and coupled using any suitable hardware- or software-based signal paths. The CNN 200 may be trained for fine-grained image classification. In particular, each of the convolutional layers 202 along with the GPA 208 and fully connected layer 210 may have associated weights that are adjusted during training such that the output layer 212 accurately classifies images 112 received at the input layer.

Each convolutional layer 202 may include a fixed-size feature map that can be represented as a 3-dimensional matrix having dimensions W'×H'×D', where D' corresponds to the number of layers (or "depth") within that feature map. The dimensions of the convolutional layers 202 may be irrespective of the images being classified. For example, the last convolution layer 202 may have width W'=7, height H'=7, and depth D'=1024, regardless of the size of the image 112.

After putting an image 112 through a single pass of a CNN 200, multi-channel data may be extracted from the last convolutional layer 202d. A general activation map 206 may be generated by summing 204 over all the channels of the extracted multi-channel data. For example, if the last convolution layer 202d is structured as a 7×7 matrix with 1024 channels, then the extracted multi-channel data would be a 7×7×1024 matrix and the resulting general activation map 206 would be a 7×7 matrix of values, where each value corresponds to a sum over 1024 channels. In some embodiments, the general activation map 206 is normalized such that each of its values is in the range [0, 1]. The general activation map 206 can be used to determine the location of an object within the image. In some embodiments, the general activation map 206 can be used to determine a bounding box for the object within the image 112.

FIGS. 3A, 3B, 4A, and 4B illustrate object detection using a general activation map, such as general activation map 206 of FIG. 2. In each of these figures, a 7×7 general activation map is shown overlaid on an image and depicted using dashed lines. The overlaid map may be upscaled according to the dimensions of the image. For example, if the image has dimensions 700×490 pixels, then the 7×7 general activation map may be upscaled such that each map element corresponds to 100×70 pixel area of the image. Each element of the general activation map has a value calculated by summing multi-channel data extracted from the CNN (e.g., from convolutional layer 202d in FIG. 2). The map values are illustrated in FIGS. 3A, 3B, 4A, and 4B by variations in color (i.e., as a heatmap), but which colors have been converted to greyscale for this disclosure.

Figure 3A:
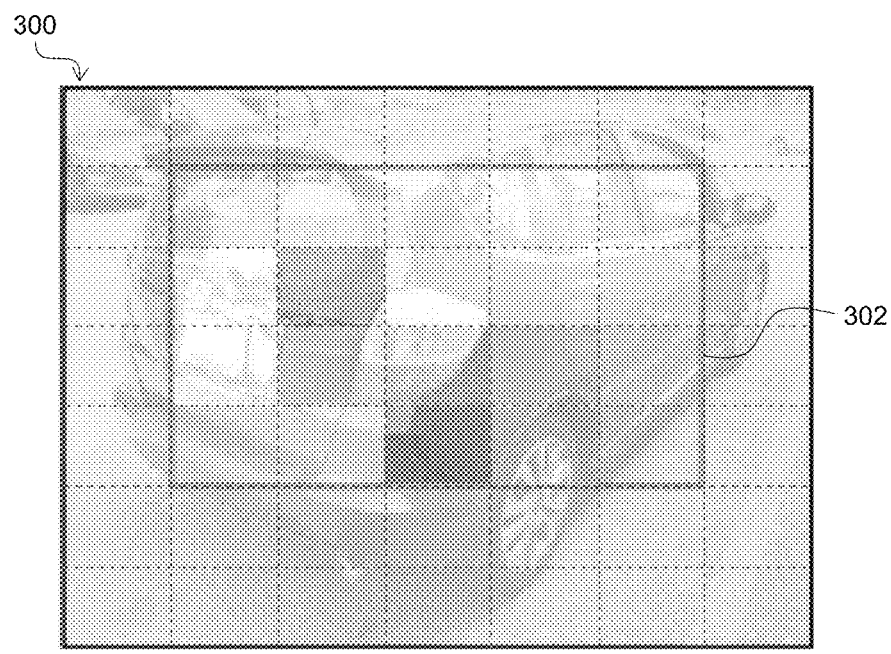
FIGS. 3A, 3B, 4A, and 4B illustrate object detection techniques, according to some embodiments of the present disclosure.

Referring to FIG. 3A, an object may be detected within the image 300 using a 7×7 general activation map. In some embodiments, each value within the map is compared to a predetermined threshold value and a bounding box 302 may be drawn around the elements of the map that have values above the threshold. The bounding box 302 approximately corresponds to the location of the object within the image 300. In some embodiments, the threshold value may be a parameter that can be adjusted based on a desired granularity for the bounding box 302. For example, the threshold value may be lowered to increase the size of the bounding box 302, or raised to decrease the size of the bounding box 302.

Figure 3B:
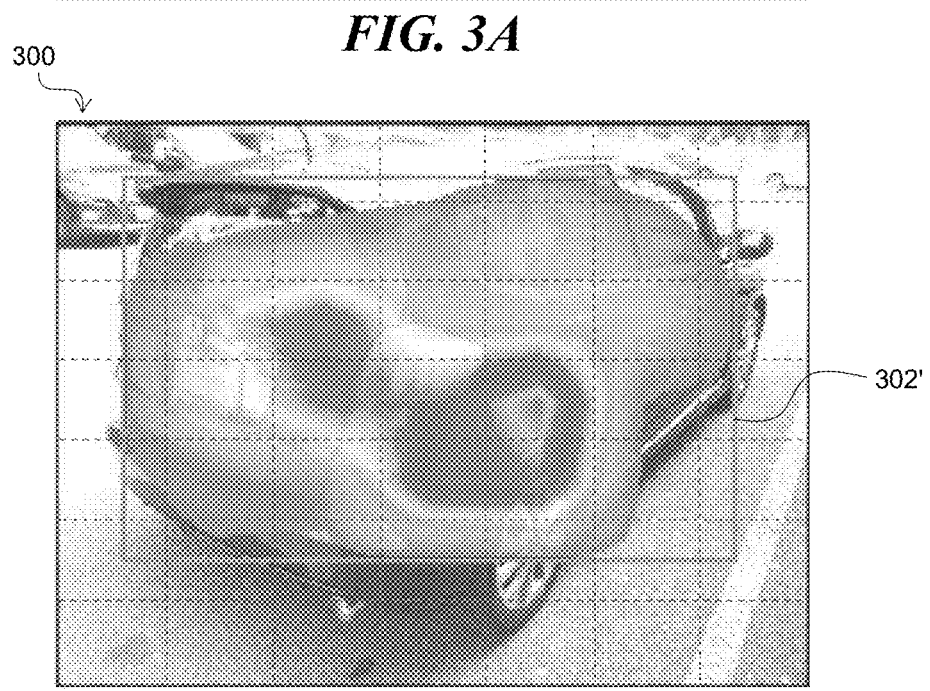

Referring to FIG. 3B, in some embodiments, the general activation map may be interpolated to achieve a more accurate (i.e., "tighter") bounding box 302' for the object. Any suitable interpolation technique can be used. In some embodiments, a predetermined threshold value is provided as a parameter for the interpolation process. A bounding box 302' can then be drawn around the interpolated data, as shown. In contrast to the bounding box 302 in FIG. 3A, the bounding box 302' in FIG. 3B may not align with the upscaled general activation map boundaries (i.e., the dashed lines in the figures).

Figure 4A:
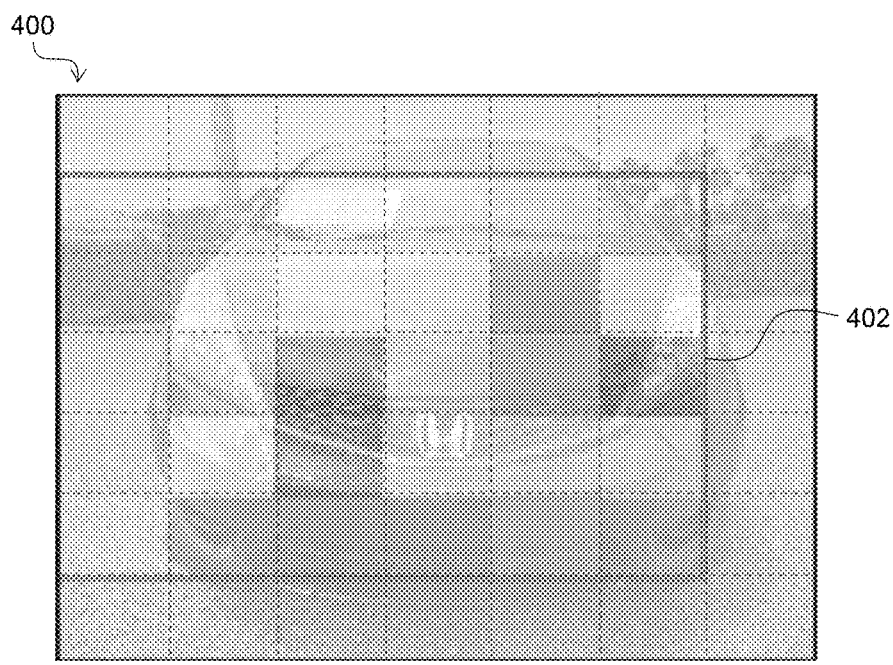
Figure 4B:
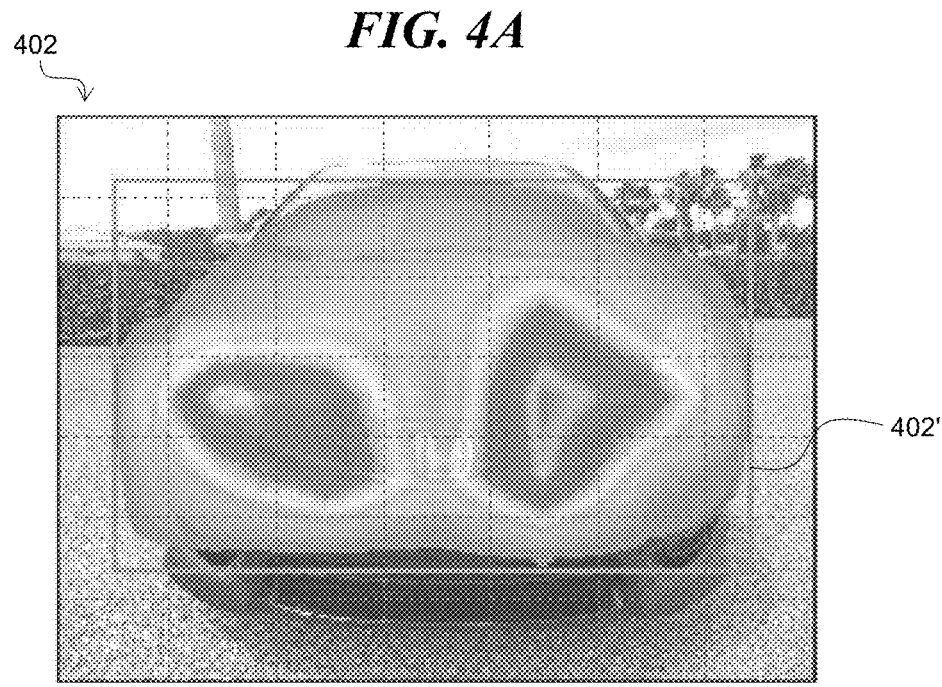

FIGS. 4A and 4B illustrate object detection using another image 400. In FIG. 4A, a bounding box 402 may be determined by comparing values within an upscaled 7×7 general activation map to a threshold value. In FIG. 4B, the general activation map may be interpolated and a different bounding box 402' may be established based on the interpolated data.

The techniques described herein provide approximate object detection to be performed using a CNN that is designed and trained for image classification. In this sense, object detection can be achieved "for free" (i.e., with minimal resources) making it well suited for mobile apps that may be resource constrained.

Figure 5:
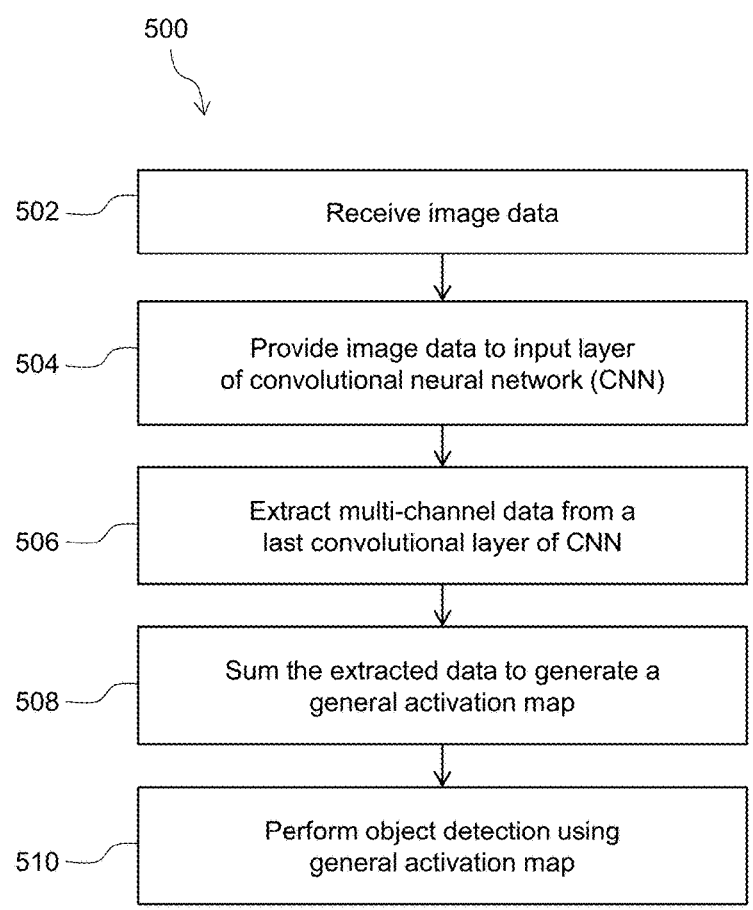
FIG. 5 is a flow diagram showing processing that may occur within the system of FIG. 1, according to some embodiments of the present disclosure.

FIG. 5 is a flow diagram showing processing that may occur within the system of FIG. 1, according to some embodiments of the present disclosure. At block 502, image data may be received. In some embodiments, the image data may be converted from a specific image format (e.g., JPEG, PNG, or GIF) to a normalized (e.g., matrix-based) data representation.

At block 504, the image data may be provided to an input layer of a convolutional neural network (CNN). The CNN may include the input layer, a plurality of convolutional layers, a fully connected layer, and an output layer, where a first convolutional layer is coupled to the input layer and a last convolutional layer is coupled to the fully connected layer.

At block 506, multi-channel data may be extracted from the last convolutional layer. At block 508, the extracted multi-channel data may be summed over all channels to generate a 2-dimensional general activation map.

At block 510, the general activation map may be used to perform object detection within the image. In some embodiments, each value within the general activation map is compared to a predetermined threshold value. A bounding box may be established around the values that are above the threshold value. The bounding box may approximate the location of an object within the image. In some embodiments, the general activation map may be interpolated to determine a more accurate bounding box. In some embodiments, the general activation map and/or the bounding box may be upscaled based on the dimensions of the image.

FIG. 6 shows a user device, according to an embodiment of the present disclosure. The illustrative user device 600 may include a memory interface 602, one or more data processors, image processors, central processing units 604, and/or secure processing units 605, and a peripherals interface 606. The memory interface 602, the one or more processors 604 and/or secure processors 605, and/or the peripherals interface 606 may be separate components or may be integrated in one or more integrated circuits. The various components in the user device 600 may be coupled by one or more communication buses or signal lines.

Sensors, devices, and subsystems may be coupled to the peripherals interface 606 to facilitate multiple functionalities. For example, a motion sensor 610, a light sensor 612, and a proximity sensor 614 may be coupled to the peripherals interface 606 to facilitate orientation, lighting, and proximity functions. Other sensors 616 may also be connected to the peripherals interface 606, such as a global navigation satellite system (GNSS) (e.g., GPS receiver), a temperature sensor, a biometric sensor, magnetometer, or other sensing device, to facilitate related functionalities.

A camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. The camera subsystem 620 and the optical sensor 622 may be used to collect images of a user to be used during authentication of a user, e.g., by performing facial recognition analysis.

Communication functions may be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 624. The specific design and implementation of the communication subsystems 624 may depend on the communication network(s) over which the user device 600 is intended to operate. For example, the user device 600 may include communication subsystems 624 designed to operate over a GSM network, a GPRS network, an EDGE network, a WiFi or WiMax network, and a Bluetooth™ network. For example, the wireless communication subsystems 624 may include hosting protocols such that the device 6 can be configured as a base station for other wireless devices and/or to provide a WiFi service.

An audio subsystem 626 may be coupled to a speaker 628 and a microphone 630 to facilitate voice-enabled functions, such as speaker recognition, voice replication, digital recording, and telephony functions. The audio subsystem 626 may be configured to facilitate processing voice commands, voiceprinting, and voice authentication, for example.

The I/O subsystem 640 may include a touch-surface controller 642 and/or other input controller(s) 644. The touch-surface controller 642 may be coupled to a touch surface 646. The touch surface 646 and touch-surface controller 642 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of the speaker 628 and/or the microphone 630.

In some implementations, a pressing of the button for a first duration may disengage a lock of the touch surface 646; and a pressing of the button for a second duration that is longer than the first duration may turn power to the user device 600 on or off. Pressing the button for a third duration may activate a voice control, or voice command, module that enables the user to speak commands into the microphone 630 to cause the device to execute the spoken command. The user may customize a functionality of one or more of the buttons. The touch surface 646 can, for example, also be used to implement virtual or soft buttons and/or a keyboard.

In some implementations, the user device 600 may present recorded audio and/or video files, such as MP3, AAC, and MPEG files. In some implementations, the user device 600 may include the functionality of an MP3 player, such as an iPod™. The user device 600 may, therefore, include a 36-pin connector and/or 8-pin connector that is compatible with the iPod. Other input/output and control devices may also be used.

The memory interface 602 may be coupled to memory 650. The memory 650 may include high-speed random access memory and/or non-volatile memory, such as one or more magnetic disk storage devices, one or more optical storage devices, and/or flash memory (e.g., NAND, NOR). The memory 650 may store an operating system 652, such as Darwin, RTXC, LINUX, UNIX, OS X, WINDOWS, or an embedded operating system such as VxWorks.

The operating system 652 may include instructions for handling basic system services and for performing hardware dependent tasks. In some implementations, the operating system 652 may be a kernel (e.g., UNIX kernel). In some implementations, the operating system 652 may include instructions for performing voice authentication.

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 may store instructions and data 672 for an augmented reality (AR) app, such as discussed above in conjunction with FIG. 1. For example, the memory 650 may store instructions corresponding to one or more of the modules 102, 104, 108, 110 shown in FIG. 1, along with the data for one or more machine learning models 106 and/or data for images 112 being processed thereby.

Each of the above identified instructions and applications may correspond to a set of instructions for performing one or more functions described herein. These instructions need not be implemented as separate software programs, procedures, or modules. The memory 650 may include additional instructions or fewer instructions. Furthermore, various functions of the user device may be implemented in hardware and/or in software, including in one or more signal processing and/or application specific integrated circuits.

In some embodiments, processor 604 may perform processing including executing instructions stored in memory 650, and secure processor 605 may perform some processing in a secure environment that may be inaccessible to other components of user device 600. For example, secure processor 605 may include cryptographic algorithms on board, hardware encryption, and physical tamper proofing. Secure processor 605 may be manufactured in secure facilities. Secure processor 605 may encrypt data/challenges from external devices. Secure processor 605 may encrypt entire data packages that may be sent from user device 600 to the network. Secure processor 605 may separate a valid user/external device from a spoofed one, since a hacked or spoofed device may not have the private keys necessary to encrypt/decrypt, hash, or digitally sign data, as described herein.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for performing object detection using image classification models, the method comprising:
    receiving image data for an image, wherein the image data is received in a system comprising a convolutional neural network (CNN), the CNN comprising an input layer, a first convolutional layer coupled to the input layer, a last convolutional layer, a fully connected layer coupled to the last convolution layer, and an output layer;
    providing the image data to the input layer;
    extracting multi-channel data from the last convolutional layer;
    summing the multi-channel data to generate a two-dimensional general activation map; and
    detecting a location of an object within the image by applying the general activation map to the image data.

2. The method of claim 1 wherein generating the general activation map comprises generating the general activation map without using class-specific weights.

3. The method of claim 1 wherein detecting the location of an object within the image comprises identifying a bounding box within the image based on comparing values within the general activation map to a predetermined threshold value.

4. The method of claim 1 wherein detecting the location of an object within the image comprises:
    interpolating data within the general activation map; and
    identifying a bounding box within the image using the interpolated data.

5. The method of claim 1 wherein detecting the location of an object within the image comprises upscaling the general activation map based on dimensions of the image.

6. A method for augmenting an image using single-pass object detection and image classification, the method comprising:
    receiving image data for an image, wherein the image data is received in a system comprising a convolutional neural network (CNN), the CNN comprising an input layer, a first convolutional layer coupled to the input layer, a last convolutional layer, a fully connected layer coupled to the last convolution layer, and an output layer;
    extracting multi-channel data from the output of the last convolutional layer;
    summing the extracted data to generate a two-dimensional general activation map;
    detecting a location of an object within the image by applying the general activation map to the image data;
    receiving one or more classifications the output layer; and
    displaying the image and a content overlay, wherein a position of the content overlay relative to the image is determined using the detected object location, wherein the content overlay comprises information determined by the one or more classifications.

7. The method of claim 6 wherein generating the general activation map comprises generating the general activation map without using class-specific weights.

8. The method of claim 6 wherein detecting the location of an object within the image comprises identifying a bounding box within the image based on comparing values within the general activation map to a predetermined threshold value.

9. The method of claim 6 wherein detecting the location of an object within the image comprises:
    interpolating data within the general activation map; and
    identifying a bounding box within the image using the interpolated data.

10. The method of claim 6 wherein detecting the location of an object within the image comprises upscaling the general activation map based on dimensions of the image.

11. A system for performing single-pass object detection and image classification, the system comprising:
    a processor;
    a convolutional neural network (CNN) configured for execution on the processor, the CNN comprising a first convolutional layer, a last convolutional layer, and a fully connected layer, wherein an output of the last convolutional layer is coupled to an input of the fully connected layer;
    an image ingestion module configured for execution on the processor to receive image data for an image and to provide the image data to an input of the first convolutional layer;
    an object detection module configured to extract multi-channel data from the output of the last convolutional layer, sum the extracted data to generate a two-dimensional general activation map, and to detect a location of an object within the image by applying the general activation map to the image data; and
    an image augmentation module configured for execution on the processor to receive one or more classifications from an output of the fully connected layer and to display the image and a content overlay, wherein a position of the content overlay relative to the image is determined using the detected object location.

12. The system of claim 11 wherein the object detection module is configured to generate the general activation map without using class-specific weights.

13. The system of claim 11 wherein the object detection module is configured to detect the location of an object within the image by identifying a bounding box within the image based on comparing values within the general activation map to a predetermined threshold value.

14. The system of claim 11 wherein the object detection module is configured to:
    interpolate data within the general activation map; and
    identify a bounding box within the image using the interpolated data.

15. The system of claim 11 wherein the object detection module is configured to detect the location of an object within the image by upscaling the general activation map based on dimensions of the image.

16. A non-transitory computer-readable medium storing program instructions that are executable to:
    receive image data for an image, wherein the image data is received in a system comprising a convolutional neural network (CNN), the CNN comprising a first convolutional layer, a last convolutional layer, and a fully connected layer, wherein an output of the last convolutional layer is coupled to an input of the fully connected layer;
    provide the image data to an input of the first convolutional layer;
    extract multi-channel data from the output of the last convolutional layer;
    sum the extracted data to generate a two-dimensional general activation map;
    detect a location of an object within the image by applying the general activation map to the image data;
    receive one or more classifications from an output of the fully connected layer; and
    display the image and a content overlay, wherein a position of the content overlay relative to the image is determined using the detected object location.

17. The non-transitory computer-readable medium of claim 16 wherein the program instructions are executable to generate the general activation map without using class-specific weights.

18. The non-transitory computer-readable medium of claim 16 wherein the program instructions are executable to detect the location of an object within the image by identifying a bounding box within the image based on comparing values within the general activation map to a predetermined threshold value.

19. The non-transitory computer-readable medium of claim 16 wherein the program instructions are executable to:
    interpolate data within the general activation map; and
    identify a bounding box within the image using the interpolated data.

20. The non-transitory computer-readable medium of claim 16 wherein the program instructions are executable to detect the location of an object within the image by upscaling the general activation map based on dimensions of the image.

* * * * *